(12) United States Patent
Schürmann et al.

(10) Patent No.: US 11,766,739 B2
(45) Date of Patent: Sep. 26, 2023

(54) LASER MACHINING SYSTEM AND METHOD FOR A LASER MACHINING SYSTEM

(71) Applicant: Precitec GmbH & Co. KG, Gaggenau (DE)

(72) Inventors: Bert Schürmann, Gernsbach (DE); Niklas Weckenmann, Rastatt (DE)

(73) Assignee: Precitec GmbH & Co. KG, Gaggenau (DE)

(*) Notice: Subject to any disclaimer, the term of this patent is extended or adjusted under 35 U.S.C. 154(b) by 278 days.

(21) Appl. No.: 16/542,714

(22) Filed: Aug. 16, 2019

(65) Prior Publication Data

US 2020/0055142 A1  Feb. 20, 2020

(30) Foreign Application Priority Data

Aug. 17, 2018 (DE) ...................... 10 2018 120 123.0
Jul. 29, 2019 (DE) ...................... 10 2019 120 398.8

(51) Int. Cl.
*B23K 26/03* (2006.01)
*B23K 26/035* (2014.01)
(Continued)

(52) U.S. Cl.
CPC .......... *B23K 26/032* (2013.01); *B23K 26/035* (2015.10); *B23K 26/0624* (2015.10); *B23K 26/1462* (2015.10); *B23K 26/38* (2013.01)

(58) Field of Classification Search
CPC ............... B23K 26/032; B23K 26/035; B23K 26/0624; B23K 26/1462; B23K 26/38;
(Continued)

(56) References Cited

U.S. PATENT DOCUMENTS 4,576,480 A * 3/1986 Travis ................. B23K 26/043
219/121.78
4,769,523 A 9/1988 Tanimoto et al.
(Continued)

FOREIGN PATENT DOCUMENTS

DE 112010003743 B4 5/2015
DE 102015012565 B3 10/2016
WO 2006128663 A1 12/2006

*Primary Examiner* — Tu B Hoang
*Assistant Examiner* — Bonita Khlok
(74) *Attorney, Agent, or Firm* — DINSMORE & SHOHL LLP

(57) ABSTRACT

A laser machining system for machining a workpiece uses a laser beam, preferably for cutting or welding a workpiece using a laser beam. The laser machining system includes a machining head with a housing having an opening for emitting the laser beam from the machining head, a measuring device configured to direct an optical measurement beam through the opening, and an optical unit for aligning the laser beam and the optical measurement beam, the optical unit being settable to adjust the laser beam and the optical measurement beam perpendicular to the optical axis of the machining head in the region of the opening. The measuring device is further configured to determine a setting of the optical unit corresponding to the central alignment of the laser beam on the basis of measurement values based on reflections of the optical measurement beam for different settings of the optical unit.

9 Claims, 7 Drawing Sheets

(51) Int. Cl.
*B23K 26/14* (2014.01)
*B23K 26/38* (2014.01)
*B23K 26/0622* (2014.01)

(58) Field of Classification Search
CPC .......... B23K 26/00; B23K 26/02; B23K 9/00; G01B 11/26
USPC ............ 219/121.62, 121.78, 121.85, 121.76, 219/121.82, 121.83; 356/153
See application file for complete search history.

(56) References Cited

U.S. PATENT DOCUMENTS

| | | | |
|---|---|---|---|
| 6,014,206 A * | 1/2000 | Basting | H01S 3/0071 356/138 |
| 2009/0001063 A1 | 1/2009 | Weick et al. | |
| 2016/0296376 A1* | 10/2016 | Rill | A61F 9/00836 |
| 2018/0011177 A1* | 1/2018 | Sugiura | G01S 7/4913 |

* cited by examiner

LASER MACHINING SYSTEM AND METHOD FOR A LASER MACHINING SYSTEM

CROSS-REFERENCE TO RELATED APPLICATION

This application claims priority from German Application No. 10 2018 120 123.0 filed Aug. 17, 2018 and German Application No. 10 2019 120 398.8, filed Jul. 29, 2019, the entire content of which are incorporated herein by reference.

FIELD OF THE INVENTION

The present disclosure relates to a laser machining system configured to machine a workpiece using a laser beam and a method for a laser machining system. In particular, the present disclosure relates to a laser machining head, e.g., for laser welding or laser cutting, with an optical coherence tomograph for measurement of the distance to the workpiece.

BACKGROUND OF THE INVENTION

In a device for machining material using a laser, e.g., in a laser machining head for laser welding or laser cutting, the laser beam emitted from a laser light source or an end of a laser fiber is focused or collimated onto the workpiece to be machined by means of a beam guiding and focusing optics.

For laser machining of material, in particular for laser cutting or laser welding, the laser beam must be emitted centered from the laser machining head. In particular, the laser beam must be central or centered with respect to an opening of the laser machining head through which the laser beam exits the machining head in order to avoid unwanted reflections of the laser beam within the machining head and to ensure optimal machining. The opening may be formed, for example, in a nozzle or a cutting nozzle. This central alignment of the laser beam must be performed every time a component of the laser machining head is changed, e.g., when changing the nozzle, an optics in the beam path of the laser beam, the laser source and the like. Centrally aligning the laser beam is usually a cumbersome manual procedure, such as repeating the steps of affixing an adhesive strip to the opening, burning the position of the laser beam as well as the opening thereinto, and manually moving a focusing optics and thereby the position of the laser beam perpendicular to the beam axis until a central position of the laser beam with respect to the opening is established. For this purpose, a nozzle with a relatively large opening must be used, which may then be replaced successively with nozzles with a smaller opening in order to increase the accuracy of the centering.

SUMMARY OF THE INVENTION

It is an object of the present disclosure to provide a laser machining system for machining a workpiece using a laser beam and a method for machining a workpiece using a laser beam, allowing for accurate and easy centering of the laser beam.

This object is achieved by the subject matter disclosed herein. Advantageous embodiments of the invention are also disclosed.

According to an aspect of the present disclosure, a laser machining system for machining a workpiece using a laser beam, preferably for cutting or welding a workpiece using a laser beam, is provided, comprising: a machining head with a housing having an opening for emitting the laser beam from the machining head, and a measuring device configured to direct an optical measurement beam through the opening. The laser machining system further comprises an optical unit for aligning the laser beam and the optical measurement beam, wherein the optical unit is settable in order to adjust the laser beam and the optical measurement beam perpendicular to the optical axis of the machining head in the region of the opening. The measuring device is further configured to determine s setting of the optical unit corresponding to the central alignment of the laser beam on the basis of measurement values based on reflections of the optical measurement beam for various settings of the optical unit. The optical unit may comprise a measurement optics for aligning the optical measurement beam, wherein the measurement optics is settable such that the optical measurement beam is adjustable perpendicular to an optical axis of the machining head in the region of the opening. In addition, the optical unit may comprise a laser optics for aligning the laser beam, wherein the laser optics is settable such that the laser beam is adjustable perpendicular to the optical axis of the machining head in the region of the opening. The measuring device may therefore be configured to determine a setting of the laser optics corresponding to the central alignment of the laser beam on the basis of measurement values based on reflections of the optical measurement beam, for example at a surface of a substrate or within the machining head, for different settings of the measurement optics. The measurement optics may comprise at least one optical element which is arranged in the beam path of the measurement beam and is displaceable or adjustable in at least one direction x and/or y perpendicular to its optical axis and/or to a beam axis of the measurement beam. Similarly, the laser optics may comprise at least one optical element which is arranged in the beam path of the laser beam and is displaceable or adjustable in at least one direction x and/or y perpendicular to its optical axis and/or to a beam axis of the laser beam. The different settings of the measurement optics or of the laser optics may comprise different positions of the measurement optics or of the laser optics in at least one direction x and/or y perpendicular to the optical axis of the machining head. In other words, the measurement optics or the laser optics may be displaceable or adjustable along this direction. However, the different settings of the measurement optics or of the laser optics may also comprise pivoting or tilting of the measurement optics or the laser optics about an axis perpendicular to the optical axis of the machining head. The measuring device may further be configured to implement the determined setting of the laser optics, i.e., set the central alignment of the laser beam in this direction x and/or y accordingly.

According to another aspect, a method for central alignment of a laser beam in a machining head of a laser machining system for machining a workpiece using the laser beam is provided, comprising the steps of: providing the machining head with a housing having an opening for emitting the laser beam from the machining head; directing an optical measurement beam to an optical unit for aligning the laser beam and the optical measurement beam; adjusting the optical measurement beam in at least one direction perpendicular to an optical axis of the machining head in the region of the opening by means of the optical unit; determining a setting of the optical unit for aligning the laser beam corresponding to a centric alignment of the laser beam in this at least one direction on the basis of measurement values based on reflections of the optical measurement beam for different settings of the optical unit in this at least one direction. In an embodiment, the method comprises: providing the machining head with a housing having an opening for emitting the laser beam from the machining head; directing an optical measurement beam to a measurement optics for aligning the optical measurement beam; adjusting the optical measurement beam in at least one direction perpendicular to an optical axis of the machining head in the region of the opening by means of the measurement optics; determining a setting of a laser optics for aligning the laser beam according to a central alignment of the laser beam in this at least one direction on the basis of measurement values based on reflections of the optical measurement beam for different settings of the measurement optics in this at least one direction. Adjusting the optical measurement beam may comprise displacing the measurement optics in the corresponding at least one direction x and/or y perpendicular to the optical axis of the measurement optics and/or to a beam axis of the measurement beam. In other words, the different settings of the measurement optics may correspond to different positions of the measurement optics in this at least one direction x and/or y.

The method may further comprise setting the central alignment of the laser beam, e.g., in x and/or y direction. The method may further comprise at least one of the following steps: determining a distribution of distances between the machining head and the workpiece for different settings of the measurement optics in the at least one direction x and/or y, the distribution corresponding to a shape of the opening; determining a setting or position of the measurement optics corresponding to a center of the opening in the at least one direction x and/or y based on the distribution; and determining the setting of the laser optics for a central alignment of the laser beam in this direction x and/or y based on this setting or position. For at least one corresponding setting of the measurement optics, the optical measurement beam can be directed through the opening onto a surface, e.g., onto the workpiece or a substrate, and based on a reflection of the optical measurement beam from the surface, a distance between the machining head and the surface can be determined. For this purpose, the measurement optics may first be displaced in a first direction x and subsequently in a second direction y or simultaneously in both directions. The at least one direction may comprise a first direction X and a second direction y perpendicular thereto. The method may further comprise: burning-in a burn-in to create a spatial structure, and determining a position of the burn-in based on the measurement values. The position of the burn-in may be determined with respect to a center in a distribution of the measurement values in the at least one direction. Determining the setting of the laser optics corresponding to the central alignment of the laser beam may be based on the position of the burn-in. In addition, the machining head may be configured to perform the method according to the present disclosure.

The method and/or the laser machining system according to aspects of this disclosure may comprise one or more of the following preferred features:

The measurement optics is preferably disposed in the beam path of the measurement beam. The measurement optics may also be configured to displace a beam axis of the measurement beam in the region of the opening in accordance with an adjustment of the measurement optics.

The beam path of the measurement beam and the laser beam may be formed separately in a region. In this case, the determined setting may comprise a position of a laser optics in the beam path of the laser beam. The laser optics may be displaceable or adjustable in at least one direction x and/or y perpendicular to its optical axis. The laser optics may further be configured to displace a beam axis of the laser beam in the region of the opening in accordance with an adjustment of the laser optics. For setting the central alignment of the laser beam, therefore, the laser optics may, for example, be displaced or adjusted by an adjusting device according to the determined setting.

The optical unit may comprise a common optical element arranged in the common beam path of the laser beam and the measurement beam. This means that the measurement optics and the laser optics may be implemented by at least one common optical element arranged in the common beam path of the laser beam and the measurement beam, or the common optical element may be or comprise the measurement optics and the laser optics. Both the laser beam and the measurement beam may be directed through the common optical element. Here, the determined setting of the optical unit may comprise a setting or a position of the common optical element in the at least one direction. The common optical element may be configured to displace the beam axes of the laser beam and of the measurement beam according to a setting of the common optical element. For setting the central alignment of the laser beam, therefore, the common optical element may, for example, be displaced or adjusted by an adjusting device according to the determined setting.

The common optical element and/or the measurement optics and/or the laser optics may be part of or comprise a machining optics of the machining head. For example, the common optical element and/or the measurement optics and/or the laser optics may comprise one or more of the following elements: focusing optics for focusing the laser beam and/or the measurement beam, a collimating optics for collimating the laser beam and/or the measurement beam, a fiber end from which the laser beam and/or the measurement beam is emitted, and a mirror, or the like.

The reflections of the optical measurement beam may be reflections at a surface outside the machining head and/or within the machining head, e.g., within a nozzle of the machining head.

The measuring device may further be configured to determine a distribution of measurement values or measurement signals for different settings or positions of the measurement optics in the at least one direction x and/or y based on reflections of the optical measurement beam. The distribution of measurement values may be a distribution of distances, for example to a workpiece or between the machining head or a nozzle of the machining head and a workpiece. The measurement value distribution may correspond to a shape of the opening or depict the shape of the opening. The measuring device may further be configured to determine the setting or the position of the laser optics based on the measurement value distribution corresponding to the central alignment of the laser beam. For example, the measuring device may be configured to determine a setting or position of the measurement optics that corresponds to a center of the opening in the at least one direction x and/or y and, to determine, based on this setting or position of the measurement optics, the setting or position of the laser optics for the central alignment of the laser beam in this direction x and/or y.

The measuring device may be configured to direct the optical measurement beam through the opening onto the workpiece for at least one corresponding setting of the measurement optics or at at least one corresponding position of the measurement optics and to determine a distance to the workpiece or between the machining head and the workpiece based on a reflection of the optical measurement beam. The measuring device may comprise an optical coherence tomograph. The optical coherence tomograph may comprise a reference arm and a measuring arm and may be configured to direct the optical measuring light from the measuring arm through the opening in order to determine the distance to the workpiece based on the reflection from the workpiece and back-reflected light from the reference beam.

The machining head or housing of the machining head may comprise a nozzle including the opening. A diameter of the opening may be known. The measuring device may also be configured to determine the setting of the laser optics corresponding to the central alignment of the laser beam based on the diameter of the opening and the reflections of the optical measurement beam.

The measurement value distribution may depict a shape of the opening. That is, the distribution may contain information about the edge of the opening. For this purpose, the distribution may contain values for settings of the measurement optics at which the measurement beam passes through the opening and values for setting of the measurement optics at which the measurement beam does not pass through the opening. A displacement path or adjustment path of the measurement optics for at least one direction x and/or y may, for example, be selected such that at least the following settings may be set for this direction: a first setting or position of the measurement optics at which the measurement beam does not pass through the opening and/or remains or is reflected in the machining head; and a second setting or position of the measurement optics at which the measurement beam passes through the opening and is reflected on a surface. This results in an abrupt increase in the distribution of measurement values obtained based on the reflections of the optical measurement beam or in the distance distribution to a value which may correspond to a (optionally known) distance to the workpiece. If the opening diameter is known, the setting or position of the measurement optics corresponding to a center of the opening in this direction may be determined based on the position at which the abrupt increase in the measurement value distribution occurs. Alternatively or additionally, a third position or setting of the measurement optics may be settable at which the measurement beam also does not pass through the opening and/or remains or is reflected in the machining head. The third position or setting may be arranged along the adjustment or displacement direction such that the second position or setting is between the first and the third position or setting. In other words, the third position of the measurement optics may be opposite the first position in the displacement direction with respect to the opening. In the measurement value distribution, therefore, there is an abrupt increase, for example to the value of the distance to the surface or to the workpiece, corresponding to a first edge region of the opening, as soon as the measurement optics is adjusted from the first setting to the second setting, and an abrupt drop, for example from the value of the distance to the workpiece, corresponding to a second edge area of the opening, as soon as the measurement optics is adjusted from the second setting to the third setting. The setting of the measurement optics corresponding to the middle between the abrupt value changes in the measurement value distribution may be determined as a setting corresponding to the center of the opening in this direction. For alignment in both directions x and y, the measurement optics may first be displaced in the first direction x and subsequently in the second direction y or simultaneously in both directions. The at least one direction may comprise a first direction x and a second direction y perpendicular thereto. In an exemplary embodiment, the measuring device is configured to plot the measurement values when the measurement optics is displaced in the first direction and/or the measurement values when the measurement optics is displaced in the second direction against the corresponding settings or adjustment positions of the measurement optics in the first and/or second direction.

In an exemplary embodiment, the optical measurement beam passes through the measurement optics and/or through the opening substantially in parallel to the laser beam. The measurement beam and the laser beam may be coupled into the laser machining head together, for example by a common optical fiber. Alternatively, the measurement beam and the laser beam may be coupled into the laser machining head separately, for example at different positions on the laser machining head. If the measurement beam and the laser beam are coaxial through a common optical element, the position of the common optical element corresponding to a center of the opening in the at least one direction x and/or y may correspond to the position of the common optical element for central alignment of the laser beam, i.e., these positions may be the same. If the measurement beam and the laser beam are offset from each other by a predetermined distance, said predetermined distance may be taken into account as an offset for the determination of the setting for a central alignment of the laser beam, such as the position of the common optical element or the laser optics. Alternatively or additionally, the measuring device may be configured to take into account, from the position of a burn-in on the surface, the offset and/or the setting for a central alignment of the laser beam, e.g., the position of the common optical element or the laser optics for a central alignment of the laser beam.

The optical measurement beam may be a continuous or pulsed measurement beam, for example with a circular or oval diameter. Alternatively, the optical measurement beam may include two or more partial beams.

The setting for central alignment of the laser beam, e.g. the position of the common optical element or the laser optics corresponding to the central alignment of the laser beam in the at least one direction x and/or y, may be determined automatically. For this purpose, at least one automated and/or motorized adjusting device may be provided for displacing or adjusting the at least one common optical element or the measurement optics and/or the laser optics. If a plurality of optics are displaced, respective adjusting devices may be provided in each case, or an adjusting devices may be configured to adjust a plurality of optics. The adjusting device and/or a control of the adjusting device may be connected to the measuring device in order to transmit the positions of the at least one common optical element, the measurement optics, or the laser optics to the measuring device.

The optical measurement beam and the laser beam may have different wavelengths. In this way, reflected parts of the laser beam may be distinguished or separated from reflections of the optical measurement beam.

BRIEF DESCRIPTION OF THE DRAWINGS

Embodiments of the disclosure are illustrated in the figures and will be described in more detail below. In the figures.

DETAILED DESCRIPTION OF THE INVENTION

Figure 1:
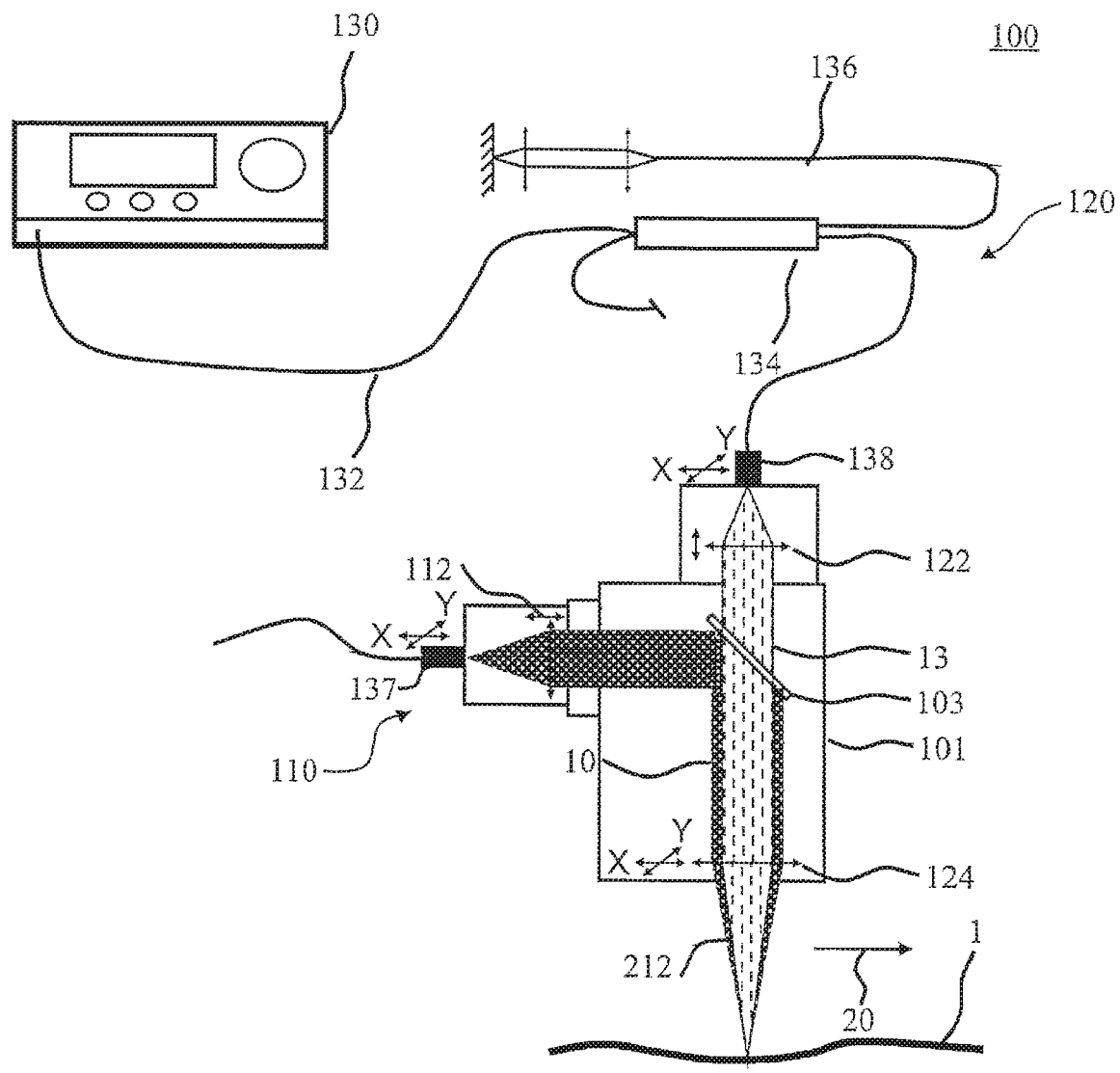
FIG. 1 shows a laser machining system with a machining head according to embodiments of the present disclosure.

In the following, unless otherwise noted, like reference numerals will be used for like and equivalent elements.

FIG. 1 shows a schematic diagram of a laser machining system 100 according to embodiments of the present disclosure. The laser machining system 100 comprises a machining head 101, for example a laser cutting or laser welding head.

The laser machining system 100 comprises a laser apparatus 110 for providing a laser beam 10 (also referred to as "laser beam" or "machining laser beam") and a measuring device for measuring a measurement value, for example a distance between a workpiece 1 and the machining head 101, e.g. a nozzle. The machining head or the nozzle includes an opening 212 through which the laser beam 101 emitted from the machining head 101.

The laser machining system 100 or parts thereof, such as the machining head 101, may be movable along a machining direction 20 according to embodiments. The machining direction 20 may be a cutting or welding direction and/or a moving direction of the laser machining system 100, such as the machining head 101, with respect to the workpiece 1. In particular, the machining direction 20 may be a horizontal direction. The machining direction 20 may also be referred to as "feed direction".

The laser apparatus 110 may include a fiber end 137 for coupling the laser beam 10 into the machining head and a collimator optics 112 for collimating the laser beam 10. Within the machining head 101, the laser beam 10 is deflected or reflected by approximately 90° in the direction of the workpiece 1 by means of a suitable optical element or optics 103. The measuring device may have a fiber end 138 for coupling an optical measurement beam 13 into the machining head 101. The optics 103, for example a semi-transparent mirror, may be configured to allow, for example, light reflected back from the workpiece 1 to pass through to the measuring device. The optical measurement beam and the laser beam may have different wavelengths, so that only back-reflected measuring light reaches the measuring device. Of course, the coupling-in point of the laser beam 10 can be swapped with that of the measurement beam 13 so that the measurement beam is deflected by 90° towards the workpiece and the semitransparent mirror 103 reflects the measurement beam wavelength.

The measuring device may be configured to determine a distance to a workpiece 1. Thereby, the distance between the machining head and the workpiece surface or the distance between a nozzle arranged at the end of the machining head and the workpiece surface can be kept constant. The more constant the distance can be kept during machining, the more stable is the machining process.

The measuring device may comprise a coherence tomograph 120 or may be a coherence tomograph 120. The coherence tomograph 120 may comprise an evaluation unit 130 having a broadband light source (e.g., a superluminescent diode, SLD) that couples the measurement light into an optical waveguide 132. In a beam splitter 134, which preferably includes a fiber coupler, the measurement light is typically split into a reference arm 136 and a measuring arm leasing into the machining head 101 via the fiber end 138 of an optical waveguide. The coherence tomograph 120 may further comprise a collimator optics 122 configured to collimate the optical measurement beam 13. The collimator optics 122 may be integrated into the machining head 101 or mounted on the machining head 101. In addition, the collimator optics 112 or 122 may be used to align, in a prior adjustment step, e.g., a manual adjustment, the optical axes of the measurement beam 13 and the laser beam 10 coaxially with respect to each other in the region of a focusing optics 124 (FIG. 1). For this purpose, the collimator optics 112 or 122 may be designed displaceable in the x and y directions, i.e., perpendicular to the optical axis of the laser beam 10 and the measurement beam 13.

In the machining head 101, a focusing optics 124 configured to focus the laser beam 10 and/or the optical measurement beam 13 onto the workpiece 1 is further provided. The focusing optics 124 may be a common focusing optics, such as a focus lens, for the laser beam 10 and the measurement beam 13.

In some embodiments, the laser beam 10 and the optical measurement beam 13 may be parallel or even coaxial at least in sections, and may in particular be coaxially superposed at least in sections. For example, the coherence tomograph 120 may be configured to couple the optical measurement beam 13 into a beam path of the laser apparatus 110. The merging of the optical measurement beam 13 and the laser beam 10 may take place downstream of the collimator optics 122 and upstream of the focusing optics 124. Alternatively, the beam paths of the measurement beam 13 and of the laser beam 10 are largely guided separately and merged only downstream of the collimator optics 122 and upstream of the focusing optics 124, or downstream of the focusing optics 124 upstream of the opening of the laser machining head 101. The beam axes of the laser beam 10 and of the measurement beam 13 may be parallel or even coaxial near the opening 212, and are preferably perpendicular to the workpiece surface.

The principle of distance measurement described herein is based on the principle of optical coherence tomography, making use of the coherence properties of light using an interferometer. For distance measurement, the optical measurement beam 13 is directed onto a surface 2 of the workpiece 1. The measurement light reflected back from the surface is imaged onto the exit/entry surface of the optical waveguide 138 by the focusing optics 124, superposed with the light reflected back from the reference arm 136 in the fiber coupler 134, and then directed back to the evaluation unit 130. The superposed light contains information about the path length difference between the reference arm 136 and the measurement arm. This information is evaluated in the evaluation unit 130, whereby the user obtains information about the distance between the surface of the workpiece and the machining head 101.

The measuring device may be configured for central alignment of the laser beam with respect to the opening. In order to position the laser beam 10 centrally in the opening 212, a measurement optics in the beam path of the measurement beam 13 may be displaced in a plane perpendicular to the beam axis of the measurement beam 13 by an adjusting device. When displaced perpendicular to its optical axis, the measurement optics may be configured to displace the measurement beam 13 accordingly. For example, the measurement optics may comprise at least one of the fiber end 138, the collimating optics 122, and the focusing optics 124. Alternatively, the measurement optics may also be designed to be pivotable.

For example, the measurement optics is automatically displaced while the optical measurement beam 13 is directed through the measurement optics. Thus, measurement signals or values based on reflections of the measurement beam 13 may be recorded by the measuring device. The measuring device may convert the measurement values into distances.

For different positions or for each position of the measurement optics, the corresponding measurement values or distances may be plotted against the respective position of the measurement optics. This results in a local signal distribution from which the center of the opening can be derived: If the measurement beam does not hit the opening 212, the optical measurement beam 13 may be reflected in the machining head. In contrast, if the measurement beam 13 is directed through the opening 212 onto a surface, for example onto the workpiece 1 or onto a centering substrate and is reflected, the measurement value increases abruptly. A distance determined from the measurement value may correspond to a distance to the workpiece 1 or to the centering substrate. This method is particularly suitable for a laser machining head in which laser beam and measurement beam are coupled in together, as described with reference to FIG. 5 below.

Therefore, when displacing the measurement optics in two mutually perpendicular directions x, y, a signal distribution corresponding to the shape or the cross section of the opening 212 may be recorded and thereby the position of the measurement optics corresponding to the middle or center of the signal distribution may be determined. The displacement path or adjustment path of the measurement optics in one or each of the two directions may have such an extent that at least the following positions are settable in this direction: a first position of the measurement optics at which the measurement beam does not exit from the opening 212 or is reflected in the machining head, and a second position of the measurement optics at which the measurement beam is directed through the opening onto a surface, e.g., onto the workpiece or a centering substrate, and is reflected. Furthermore, a third position of the measurement optics at which the measurement beam is also reflected in the machining head or does not exit from the opening may be settable. The third position of the measurement optics may be opposite the first position in the machining head relative to the opening 212. The first and second (and optionally the third) positions may be passed through in this order in succession when displacing the measurement optics in one direction. In any case, the displacement path of the measurement optics in x and/or y direction may be configured such that an edge of the opening 212 can be represented in the measurement value at x and/or y displacement of the measurement optics, i.e., that settings of the measurement optics with a measurement value corresponding to the distance to the surface and those without measurement value or with a measurement value other than the distance to the surface in the x and/or y direction exist.

The measurement optics may be a common optical element, i.e., the measurement optics may be arranged in the common beam path of the laser beam 10 and the measurement beam 13 and be configured, when displaced perpendicular to its optical axis, to displace the laser beam 10 and the measurement beam 13 accordingly. In this case, the measurement optics is also the laser optics or the measurement optics and the laser optics are implemented by the common optical element. Therefore, based on the measurement values, a position of the common optical element corresponding to a central alignment of the laser beam may be determined. By way of example, the common optical element may comprise or be a focusing optics, a collimator optics, and/or a fiber end from which the laser beam and the measurement beam are emitted. Alternatively, in case of a separate beam path of the laser beam 10 and the measurement beam 13, in addition to the measurement optics in the beam path of the measurement beam 13, a laser optics in the beam path of the laser beam 10, which is adjustable in a plane perpendicular to the beam axis of the laser beam 10 by an adjusting device, may be provided to position the laser beam 10 centrally in the opening 212. The laser optics may comprise, for example, a focusing optics, a collimator optics, and/or a fiber end from which the laser beam is emitted. The laser optics is configured to displace the laser beam 10 by displacing the laser optics perpendicular to its optical axis correspondingly. Thus, a position of the laser optics corresponding to the central alignment of the laser beam may be determined on the basis of the measurement values based on the displacement of the measurement optics in the beam path of the measurement beam. In this way, the laser beam 10 or the measurement beam 13 may be aligned centrally in the laser machining head in a simple and automated manner.

Figure 2:
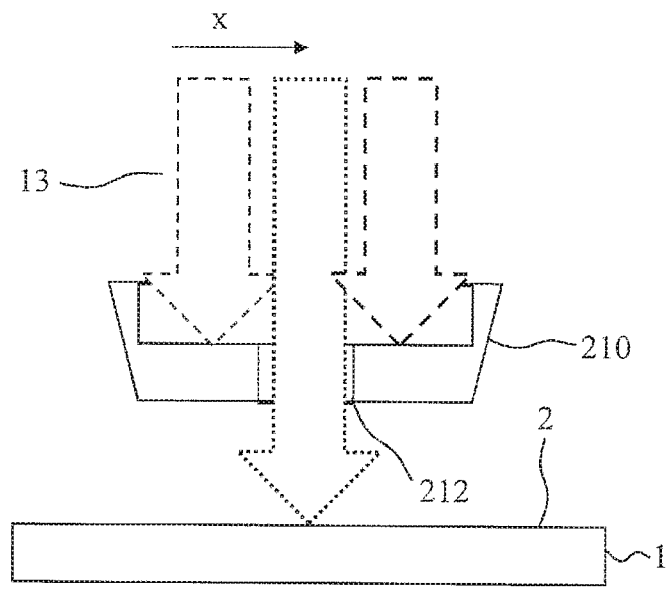
FIG. 2 shows a method for central alignment of the measurement beam or the laser beam.
Figure 2:
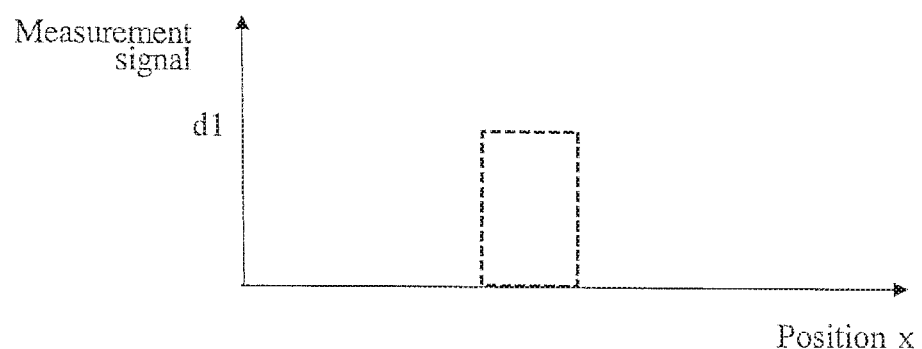
Figure 2:
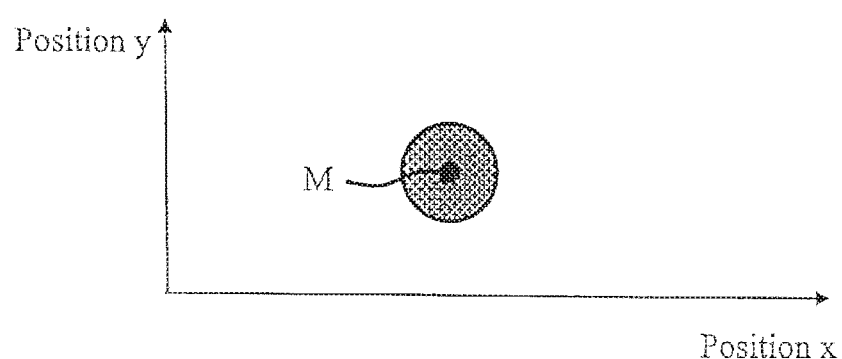

With reference to FIG. 2, the method for setting a central alignment of the laser beam 10 and the measurement beam 13 with respect to the opening 212 of a housing 210 of the laser machining head 101 according to an embodiment is described in greater detail. For this purpose, the laser machining system shown in FIG. 1 or 5 may be used. In According to the present disclosure, a simplified method for central alignment by measuring reflections of an optical measurement beam 13 while displacing a measurement optics is provided. Displacing or adjusting the measurement optics may be performed automatically and/or motor-driven by an adjusting device (not shown). Subsequently, the setting of a central alignment of the laser beam 10 may take place by setting a corresponding position of the common optical element in the common beam path or by setting a laser optics in the beam path of the laser beam automatically and/or motor-driven by an adjusting device (not shown). In the following, the laser machining system or the method for central alignment of the laser beam is explained by way of example with reference to a common optical element in the common beam path of the laser beam and the measurement beam. However, the invention is not limited thereto, but, in case of separate beam paths, a laser optics in the beam path of the laser beam for the central alignment of the laser beam may be provided in addition to the measurement optics in the beam path of the measurement beam.

In one example, the common optical element, in this case the focusing optics 124, is displaced in a plane perpendicular to the beam axis of the laser beam 10 or measurement beam 13 in at least one of the directions x and y. Thereby, as shown by way of example in FIG. 2 in the upper part for a displacement in x direction, a beam axis of the measurement beam 13 (different dashing) is also displaced in this direction. Simultaneously with the displacement of the focusing optics 124, based on a reflection of the optical measurement beam 13, e.g. within the housing 210 of the machining head or on the workpiece surface 2, a measurement value for each position of the focusing optics 124 is determined. In one embodiment, the distance d1 to the workpiece 1 is determined here based on a reflection of the optical measurement beam 13 from the workpiece surface 2 and back-reflected light from the reference arm 136. If the optical measurement beam 13 does not pass through the opening 212, no measurement value is obtained, or at least no measurement value corresponding to the distance d1. Here, the distance d1 to the workpiece 1 may be known. However, if the measurement beam 13 passes through the opening 212 at least partially, a measurement value corresponding to the distance d1 results for the corresponding position X of the focusing optics 124 (see middle part of FIG. 2). When the focusing optics 124 is displaced in x and y directions perpendicular to the beam axis, the shape of the opening 212 can be mapped by the distribution of the measurement values, the center M of which corresponds to the position of the focusing optics 124 for a central alignment of the measurement beam 13 (see lower part of FIG. 2). The position of the focusing optics 124 for central alignment of the measurement beam 13 in x direction may therefore be determined as the middle of the segment of the x displacement over which distance signals were obtained. The same applies to the position for central alignment in y direction.

Since the entire opening 212 may be mapped in the distribution of the measurement signals, an opening with any diameter may be selected. Thus, the method for central alignment may be performed irrespective of the nozzle selected for machining.

For a coaxial course of the laser beam 10 and the measurement beam 13, the determined position of the common optical element, in this case the focusing optics 124, for central alignment of the measurement beam 13 also corresponds to the position of the common optical element for central alignment of the laser beam 10. In particular, this is the case in the exemplary embodiment shown in FIG. 5, in which the laser beam 10 and the measurement beam 13 are coaxially coupled into the machining head or into the machining optics of the machining head by an optical fiber. Alternatively, the beam axis of the laser beam 10 may be offset in parallel in a known manner, such as with known x and/or y offset, with respect to the beam axis of the measurement beam 13.

However, in the embodiment of the laser machining system according to FIG. 1, the measurement beam 13 and the laser beam 10 are coupled into the machining head or into the machining optics at two different positions. Hence, the position of the laser beam 10 may not automatically be deduced from the geometric location of the measurement beam 13. In this case, for example, a burn-in 310 may be required, whereby the geometric location of the laser beam 10 with respect to the opening 212 becomes visible or measurable. This will be explained by way of example with reference to FIGS. 3A and 3B.

Figure 3A:
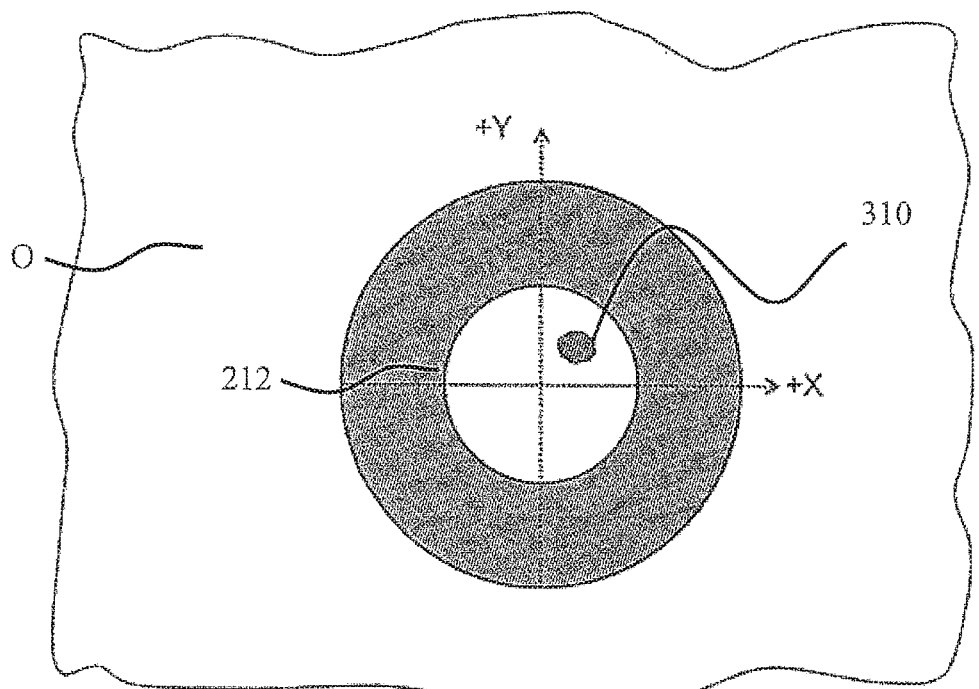
FIGS. 3A and 3B are schematic diagrams of the opening and the burn-in without or with superposed optical measurement beam.
Figure 3B:
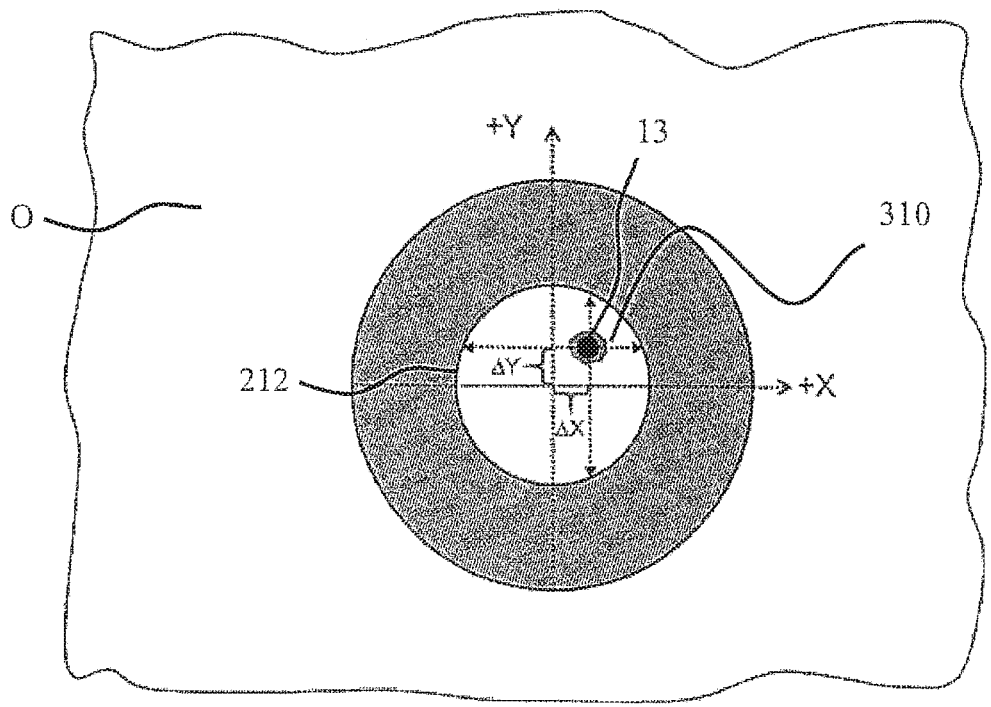
Figure 4A:
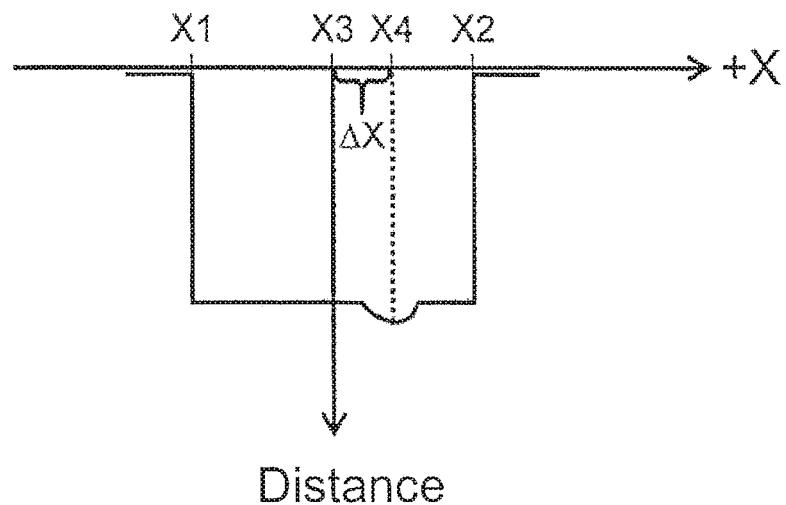
FIGS. 4A and 4B show measured distance profiles in x and y direction.
Figure 4B:
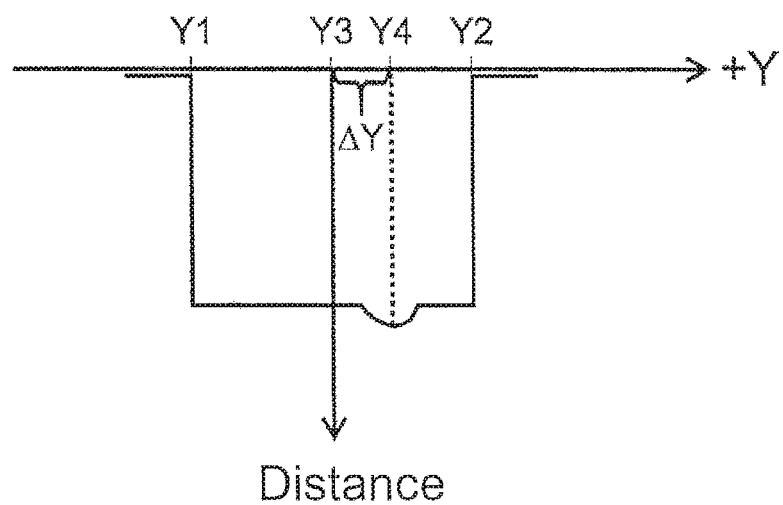

In a first step, the laser machining head may move to a position x, y and z (relative to the machine coordinate system) at which the beam centering is to be performed. This position may be on a surface O of a substrate, for example of the workpiece 1 or a separate centering station. Here, the z direction denotes the direction parallel to the laser beam axis in the region of the opening 212, and the x and y directions extend in a plane perpendicular thereto. In a second step, the laser beam 10 is ignited onto the surface O with defined parameters for a defined period of time. As shown in FIGS. 3A and 3B, a spatial structure, a so-called burn-in 310, which can be detected geometrically at least in a plane x, y, is created on the surface O. A position of the laser machining head may be kept constant during the beam centering operation at least in x and y directions. Subsequently, the optical measurement beam 13 is deflected, e.g., raster-like, in the x-y plane by displacement of the measurement optics, so as to scan the opening 212, the surface O and the burn-in 310 (topography measurement). Other forms of movement for the scanning are also conceivable, for example circular, spiral, meandering, zigzagging, etc. Thus, at each x, y coordinate, a measurement value, i.e., a distance value, results. In FIGS. 4A and 4B, the measurement value profile measured in x direction and in y direction, respectively, is shown schematically near the position of the burn-in 310. From the points X1 and X2 corresponding to the abrupt rise or fall of the signal, the center X3 located exactly in the middle between the two is derived. The position X4 of the burn-in 310 or the center of burn-in may be determined as the position of an extremum of the measurement value, i.e., a minimum or maximum value, between positions X1 and X2. The distance between the center X3 and the position of the burn-in X4 results in an offset ΔX. The same calculation is performed for the Y direction. With the offsets ΔX and ΔY, the laser beam 10 may now be centered in the center of the opening 212 by setting the corresponding position of the laser optics.

Figure 5:
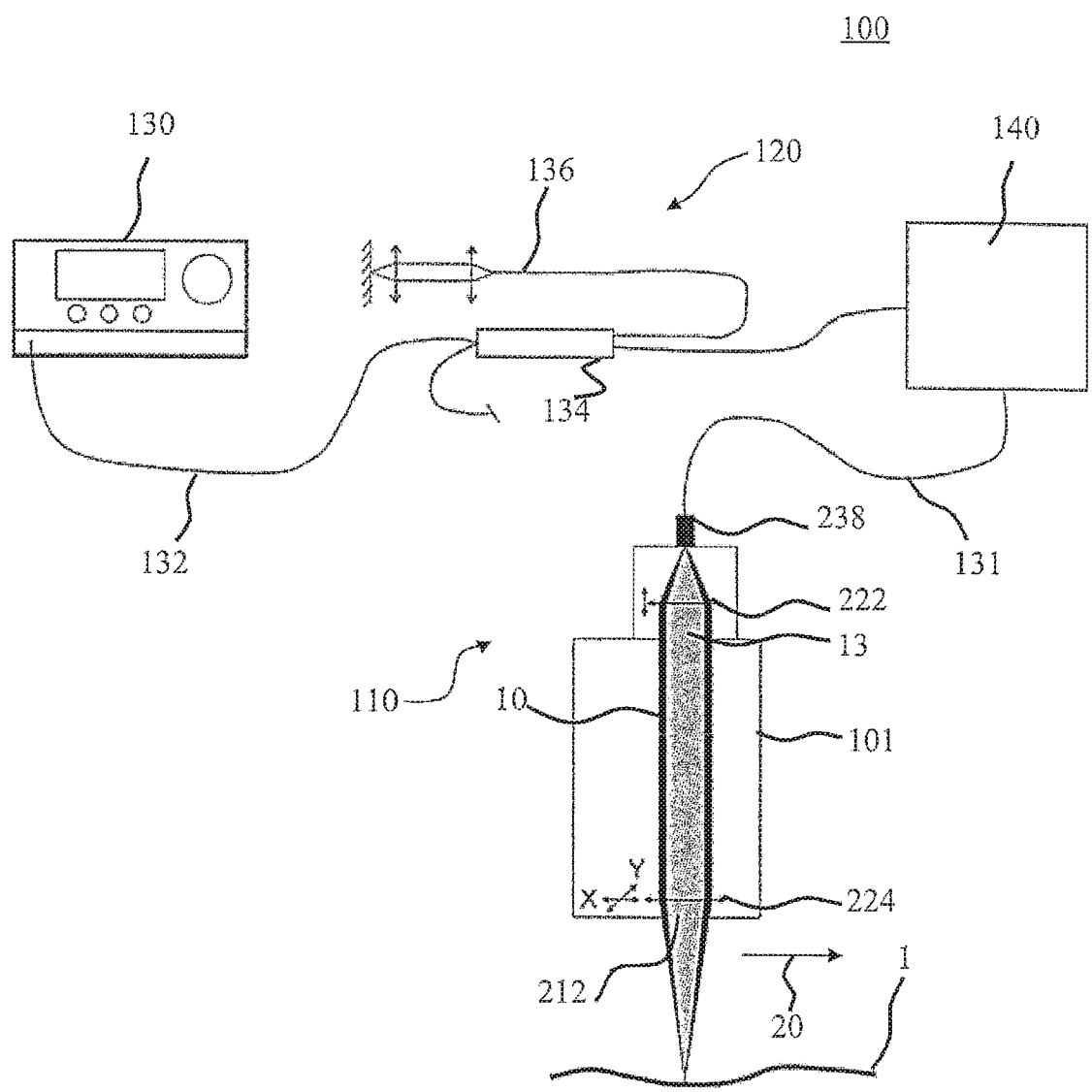
FIG. 5 shows a laser machining system with a machining head according to another embodiment of the present disclosure

Another embodiment of the laser machining system 100 is shown in FIG. 5, wherein the laser beam 10 and the optical measurement beam 13 are coupled together, and thus coaxially, into the laser machining head 101 or into the machining optics by the fiber end 238 of a common optical fiber 131. The laser beam 10 from a laser source and the measurement beam 13 of the measuring device may be introduced, for example via a coupling unit 140 such as a fiber coupler, into the optical fiber 131. The laser beam 10 and the measurement beam 13 coaxially pass through the optics of the machining head 101, e.g., the collimator optics 222 and the focusing optics 224. This has the advantage that a burn-in on a surface O is not required for the beam centering, since the optical information of the measurement beam 13 allows a direct deduction of the position of the laser beam 10. The measurement optics and the laser optics are therefore formed as a common optical element in the common beam path. The common optical element may therefore also be used to align the laser beam 10 centrally by means of a corresponding positioning. Similarly as described above, the measurement beam 13 scans the inner geometry of the opening in x and y directions at at least four positions. The deflection of the measurement beam 13 is carried out, for example, by the measurement optics or the common optical element being displaced in x and y directions (perpendicular to the optical axis). First, the measurement beam 13 is deflected, for example, in +x direction and in −x direction (X1 and X2). Therefrom, the center X3 is determined and the measurement beam 13 is accordingly centered on this position in the X direction. Subsequently, starting from the point X3, the center in y direction is determined analogously and the beam is centered on this position in y direction. Now, both the measurement beam 13 and the laser beam 10 are positioned centrally with respect to the opening 121. In one example, a common focusing optic 124 may be displaced as the common optical element. However, alternatively or additionally, a common collimator optics 122 and/or the fiber end of the optical fiber 131 from which the laser beam and the measurement beam emerge together may be displaced as the common optical element (cf. FIG. 5).

Figure 6:
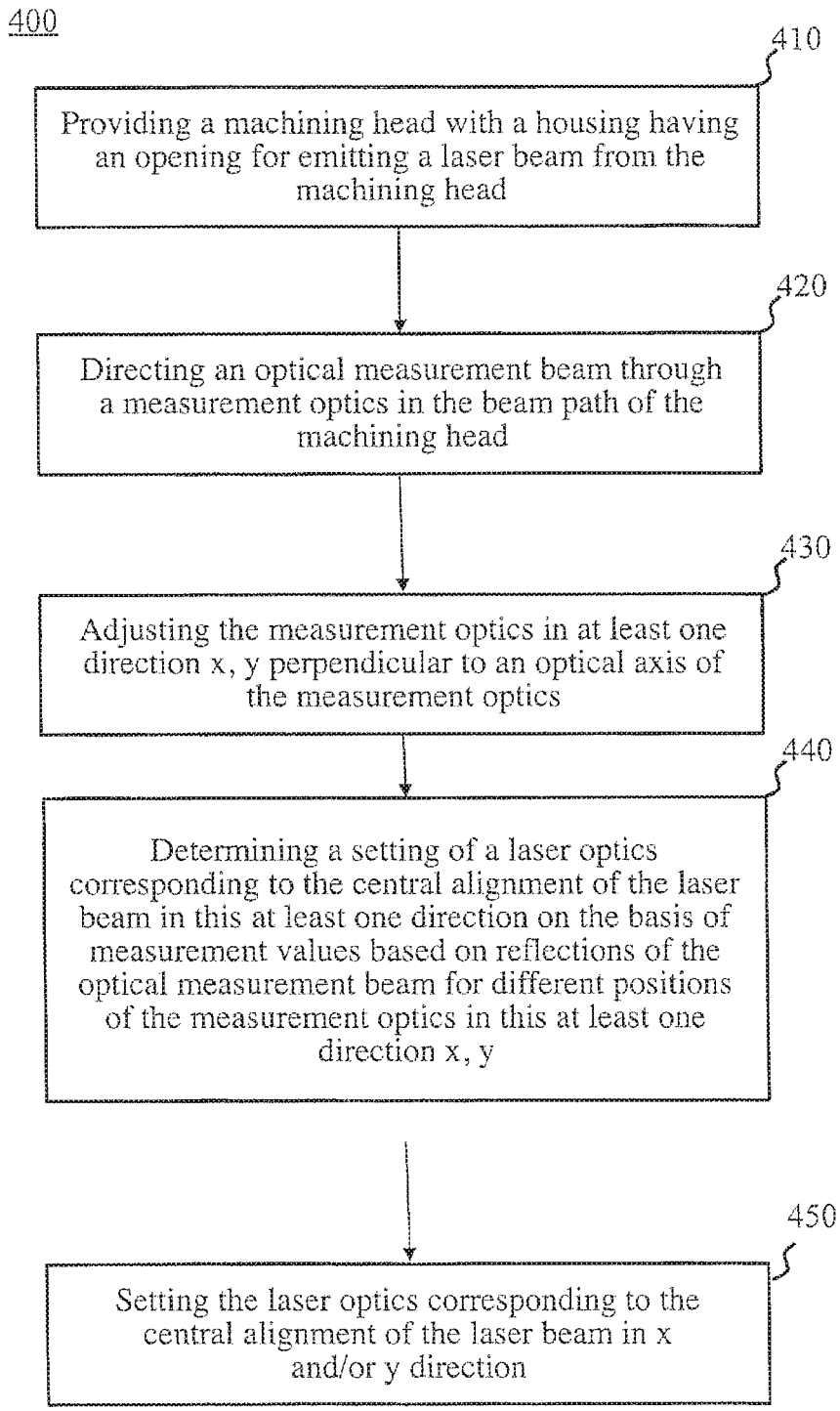
FIG. 6 shows a flowchart of a method for central alignment of a laser beam according to embodiments of the present disclosure.

FIG. 6 shows a flowchart of a method 400 for central alignment of a laser beam in a machining head. The method 400 may be implemented by the machining head or laser machining system of the present disclosure. In addition, the machining head may be configured to execute the method 400 according to the present disclosure.

The method 400 comprises, at block 410, providing a machining head 101 with a housing 210 having an opening 212 for emitting the laser beam from the machining head 101. At block 420, the optical measurement beam 13 is directed onto the measurement optics in the beam path of the machining head 101. Meanwhile, at block 430, the measurement optics is adjusted in at least one direction x and/or y perpendicular to the optical axis of the measurement optics or perpendicular to the beam axis of the measurement beam 13. At block 440, a setting of a laser optics corresponding to the central alignment of the laser beam 10 in this at least one direction x and/or y is determined on the basis of measurement values based on reflections of the optical measurement beam 13 for different positions of the measurement optics in this at least one direction x and/or y. When the measurement optics and the laser optics are formed by the common optical element arranged in the common beam path of the laser beam and the measurement beam, which is configured to displace the beam axes of both the measurement beam and the laser beam, the setting may comprise a position of the common optical element corresponding to the central alignment of the laser beam 10 in the respective direction. At block 450, the setting of the laser optics corresponding to the central alignment of the laser beam 10 is set, that is, for example, the position of the common optical element 124.

Figure 7:
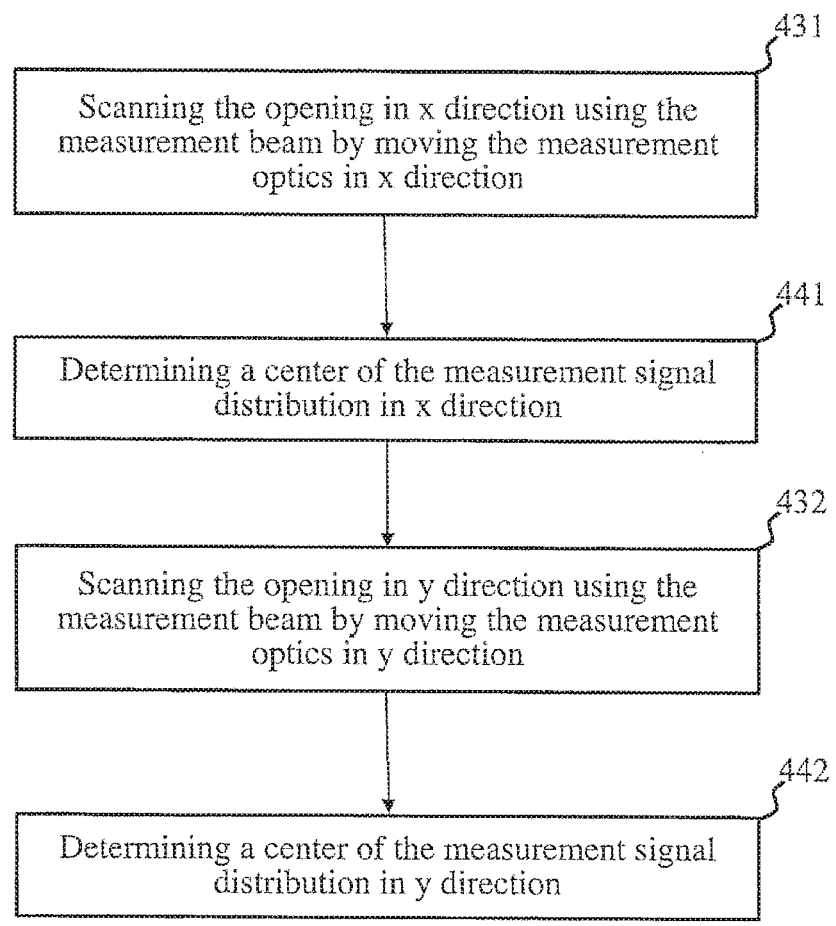
FIG. 7 shows a flowchart with further steps of the method for central alignment of a laser beam according to embodiments of the present disclosure.

Herein, the method 400 may comprise further steps: For example, as shown in FIG. 7, adjusting the measurement optics in block 430 may comprise a step 431 and/or 432, and determining the setting of the laser optics, for example the position of the common optical element, corresponding to the central alignment of the laser beam 10 in block 440 comprises a step 441 and/or 442. In step 431, the opening 212 is scanned by the optical measurement beam 13 in x direction, i.e., in a first direction perpendicular to an optical axis of the measurement optics or the beam axis of the measurement beam, by displacing the measurement optics in the beam path of the measurement beam 13, for example the focusing optics 124, in just this x direction. For this purpose, for example, the measurement beam may be deflected first in the +x direction, and then in the −x direction (with the opening center as point of origin of the coordinates). In step 441, a center X3 of the distribution is determined from the measurement value distribution in X direction. In step 432, the opening 212 is scanned by the optical measurement beam 13 in y direction, i.e., in a second direction perpendicular to the optical axis of the measurement optics or the beam axis of the measurement beam, by displacing the measurement optics in y direction. For this purpose, for example, the measurement beam may first be deflected in +y direction, and the in −y direction (with the opening center as point of origin of the coordinates). In step 442, a center Y3 of the distribution in y direction is determined from the measurement value distribution. Instead of sequential scanning in x direction and in y direction, the steps 421 and 422 may also be overlaid, so that a topography measurement is carried out by scanning the measurement beam in x and y directions in parallel or simultaneously.

In case the measurement beam and the laser beam are coaxially coupled into the machining head, as shown for example in FIG. 5, the x position or the y position of the distribution center X3 or Y3 may correspond to the position of the central alignment of the laser beam in x or y direction. When the measurement beam 13 is coupled into the machining head independently of the laser beam 10, as shown for example in FIG. 1, additionally an offset, which is either known or determined by a burn-in process, may be taken into account as described above. For this purpose, the method 400 may comprise, prior to the block 420, a step of burning-in a burn-in 310 into a surface O by means of the laser beam 10 and, for example, in or before block 440, determining an offset ΔX and ΔY (see FIGS. 3B, 4A, and 4B) in x and y directions based on a position X4 and Y4 of the burn-in 310.

According to the invention, a laser machining system and a method for a laser machining system are specified, wherein a simple and precise central alignment of a laser beam is made possible by optical coherence tomography. In a preferred embodiment, the central alignment of the laser beam is carried out in an automated process, in which a measurement optics is displaced by a motor in a plane perpendicular to an optical axis of the measurement optics to scan the exit opening of the machining head with a measurement beam and to determine a position of a laser optics corresponding to the central alignment therefrom. As a result, tedious and manual processes for central alignment may be avoided and the accuracy may be increased.

The invention claimed is:

1. A method for centrally aligning a laser beam in a machining head of a laser machining system for machining a workpiece using said laser beam, comprising:
   providing said machining head with a housing having an opening for emitting said laser beam from said machining head;
   directing an optical measurement beam onto an optical unit for aligning said laser beam and said optical measurement beam;
   adjusting said optical measurement beam in at least one direction perpendicular to an optical axis of said machining head in a region of said opening by means of said optical unit;
   wherein adjusting said optical measurement beam includes setting said optical measurement beam to a first position such that said optical measurement beam does not pass through said opening and is reflected from an internal surface within the housing adjacent to said opening, and setting said optical measurement beam to a second position such that said measurement beam passes through said opening and is reflected on an external surface outside the housing; and
   measuring distances to the internal and external surfaces to provide measurement values based on reflections from the internal and external surfaces; and
   determining by a measuring device a setting of said optical unit corresponding to a central alignment of said laser beam in said at least one direction on a basis of measurement values based on the reflections of said optical measurement beam at said first and second positions.

2. The method according to claim 1, wherein adjusting said optical measurement beam comprises scanning said opening in a plane perpendicular to the optical axis of said machining head using said optical measurement beam.

3. The method according to claim 1, wherein said optical measurement beam is directed onto the optical unit by the measuring device comprising an optical coherence tomograph.

4. The method according to claim 1, wherein said optical unit comprises at least one of: a focusing optics for focusing said laser beam, a focusing optics for focusing said measurement beam, a collimator optics for collimating said laser beam, a collimator optics for collimating said measurement beam, a fiber end for introducing said laser beam into said machining head, a fiber end for introducing said measurement beam into said machining head, and a mirror.

5. The method according to claim 1, wherein said optical unit comprises a common optical element which is arranged in a common beam path of said laser beam and said optical measurement beam, the method further comprising displacing a beam axis of said laser beam and said optical measurement beam after exiting said opening by displacing said common optical element in a plane perpendicular to the optical axis of said machining head correspondingly.

6. The method according to claim 1, wherein determining the setting of said optical unit corresponding to the central alignment of said laser beam comprises:

determining a distribution of measurement values for different settings of said optical unit, said distribution corresponding to a shape of said opening; and determining a center of said shape of said opening in said at least one direction based on said distribution which corresponds to the setting of said optical unit for the central alignment of said laser beam.

7. The method according to claim 1, further comprising:

burning-in a burn-in in said external surface such that a structure is formed; and determining a position of said burn-in on said external surface from the measurement values;

wherein determining the setting of said optical unit corresponding to the central alignment of said laser beam in this at least one direction is performed based on said position of said burn-in.

8. The method according to claim 1, further comprising:

setting said optical unit corresponding to the central alignment of said laser beam in an x and/or y direction.

9. The method according to claim 1, wherein the measurement values each correspond to distances to a reflecting surface from which respective reflections of said optical measurement beam originate.

\* \* \* \* \*